United States Patent
Sun et al.

(10) Patent No.: US 7,050,381 B2
(45) Date of Patent: May 23, 2006

(54) OPTICAL SYSTEM HAVING A CONVEX SURFACE FOR ACCESSING A STORAGE MEDIUM

(75) Inventors: Vincent Sun, Hsintien (TW); Darren Chen, Taoyuan (TW)

(73) Assignee: Discovision Associates, Irvine, CA (US)

( * ) Notice: Subject to any disclaimer, the term of this patent is extended or adjusted under 35 U.S.C. 154(b) by 146 days.

(21) Appl. No.: 10/188,481

(22) Filed: Jul. 3, 2002

(65) Prior Publication Data

US 2003/0090988 A1    May 15, 2003

(30) Foreign Application Priority Data

Nov. 12, 2001    (TW) .............................. 90130705 A

(51) Int. Cl.
*G11B 7/135* (2006.01)
(52) U.S. Cl. ................................ 369/112.28
(58) Field of Classification Search ........... 369/112.09, 369/112.14, 112.21, 112.28
See application file for complete search history.

(56) References Cited

U.S. PATENT DOCUMENTS

| | | | | |
|---|---|---|---|---|
| 4,734,905 A | * | 3/1988 | Kuwayama et al. ... | 369/112.28 |
| 5,311,496 A | * | 5/1994 | Whitehead ............. | 369/112.21 |
| 5,327,417 A | * | 7/1994 | Tanaka et al. ............... | 720/670 |
| 5,526,338 A | * | 6/1996 | Hasman et al. .......... | 369/112.1 |
| 5,541,908 A | * | 7/1996 | Hsu et al. .................... | 720/662 |
| 5,677,899 A | * | 10/1997 | Getreuer .................. | 369/44.28 |
| 5,708,633 A | * | 1/1998 | Hollen et al. ............ | 369/44.11 |

\* cited by examiner

*Primary Examiner*—Brian E. Miller
*Assistant Examiner*—Peter Vincent Agustin
(74) *Attorney, Agent, or Firm*—Steve A. Kong; Caroline T. Do

(57) ABSTRACT

An optical system for accessing a storage medium. The system combines two kinds of laser diode, abandons some unnecessary optical elements used in the prior art, and further uses a Penta prism to fold the optical path. Moreover, the optical system uses a CZBO prism to locate the two laser diodes abreast of each other. Thus, the space of the optical system is reduced, and the optical system is more compact.

4 Claims, 14 Drawing Sheets

OPTICAL SYSTEM HAVING A CONVEX SURFACE FOR ACCESSING A STORAGE MEDIUM

BACKGROUND OF THE INVENTION

1. Field of the Invention

The invention relates to an optical system for accessing a storage medium.

2. Description of the Related Art

FIG. 1 schematically shows a conventional optical pickup head for accessing a compact disc (CD) and a digital versatile disc (DVD). The conventional optical pickup head 10 has two laser diodes 1a, 1b emitting two beams with different wavelengths, two holographic optical elements (HOE) 2a, 2b, a beam splitter 3, a collimating lens 4, a mirror 5, and an objective lens 6.

As shown in FIG. 1, the conventional optical pickup head has two optical paths L1, L2, wherein one optical path L1 starts from the laser diode 1a to the DVD, and the other optical path L2 starts from the laser diode 1b to the CD. The laser diode 1a emits a beam with a wavelength of 650 nm, and the beam passing the HOE 2a is incident on the beam splitter 3. The beam passes through the beam splitter 3 and is incident on the collimating lens 4. Thus, the collimating lens 4 emits a collimated beam, and the collimated beam is reflected by the mirror 5. The collimated beam reflected by the mirror 5 is projected on the DVD 7 by the objective lens 6. Further, the DVD 7 emits a signal beam, and the signal beam following the foregoing optical path enters a detector (not shown) adjacent to the laser diode 1a, whereby the detector converts the signal beam reflected from the DVD 7 to an electric signal.

Referring to FIG. 1, another laser diode 1b emits a beam with a wavelength of 780 nm, and the beam passing the HOE 2b is incident on the beam splitter 3. The beam splitter 3 reflects the beam from the HOE 2b, and then the beam is incident on the collimating lens 4. The collimating lens 4 emits a collimated beam, and then the collimated beam is reflected by the mirror 5. The collimated beam reflected by the mirror 5 is projected on the CD 7 by the objective lens 6. Further, the CD 7 emits another signal beam, and then the signal beam following the foregoing optical path enters another detector (not shown) adjacent to the laser diode 1b, whereby the detector converts the signal beam reflected from the CD 7 to an electric signal.

However, the lengths of the two optical paths in the conventional optical pickup head are too long. Referring to FIG. 1, the optical path L1 has a length of 22.732 mm.

SUMMARY OF THE INVENTION

To solve the above problems, it is an object of the present invention to provide an optical system for accessing a storage medium, whereby the optical system for accessing a storage medium abandons some unnecessary optical elements used in the prior art. Thus, the optical system for accessing a storage medium is more compact.

According to the object, the invention provides an optical system for accessing a storage medium, which includes a laser diode, a holographic optical element, a beam splitter, a right-angle prism and an objective lens.

According to the object, the invention provides another optical system for accessing a storage medium, which includes a laser diode, a Carl Zeiss Binocular-Ocular prism (CZBO prism), a Penta prism, a right-angle prism and an objective lens.

According to the object, the invention provides another optical system for accessing a storage medium, which includes a laser diode, a CZBO prism, a Penta prism and an objective lens.

A feature of the invention is that the light beam traveling in the Penta prism generates multi-reflections therein.

Another feature of the invention is that one of the surfaces constructing the right angle of the right-angle prism is a spherical surface, so as to emit a collimated beam from the right-angle prism.

Another feature of the invention is that one of the surfaces constructing the right angle of the right-angle prism is an aspherical surface, so as to emit a collimated beam from the right-angle prism.

Another feature of the invention is that the emitting surface of the Penta prism is a spherical surface, so as to emit a collimated beam from the Penta prism.

Another feature of the invention is that the emitting surface of the Penta prism is an aspherical surface, so as to emit a collimated beam from the Penta prism.

Another feature of the invention is that the CZBO prism and two laser diodes emitting different wavelengths are packaged together, whereby the optical system for accessing a storage medium uses the CZBO prism and the two laser diodes are positioned abreast of each other.

The invention has an advantage of shrinking the space of the optical system for accessing a storage medium, wherein the optical path of the beam is folded several times within the Penta prism.

The invention has another advantage of adjusting the optical system for accessing a storage medium easier by abandoning some unnecessary optical elements.

The invention has further advantage of shrinking the space of the optical system for accessing a storage medium, whereby when the optical system uses the CZBO prism, the two laser diodes emitting different wavelengths are positioned abreast of each other.

BRIEF DESCRIPTION OF THE DRAWINGS

This and other objects and features of the invention will become clear from the following description, taken in conjunction with the preferred embodiments with reference to the drawings, in which.

DETAILED DESCRIPTION OF THE PREFERRED EMBODIMENTS

First Embodiment

Figure 1:
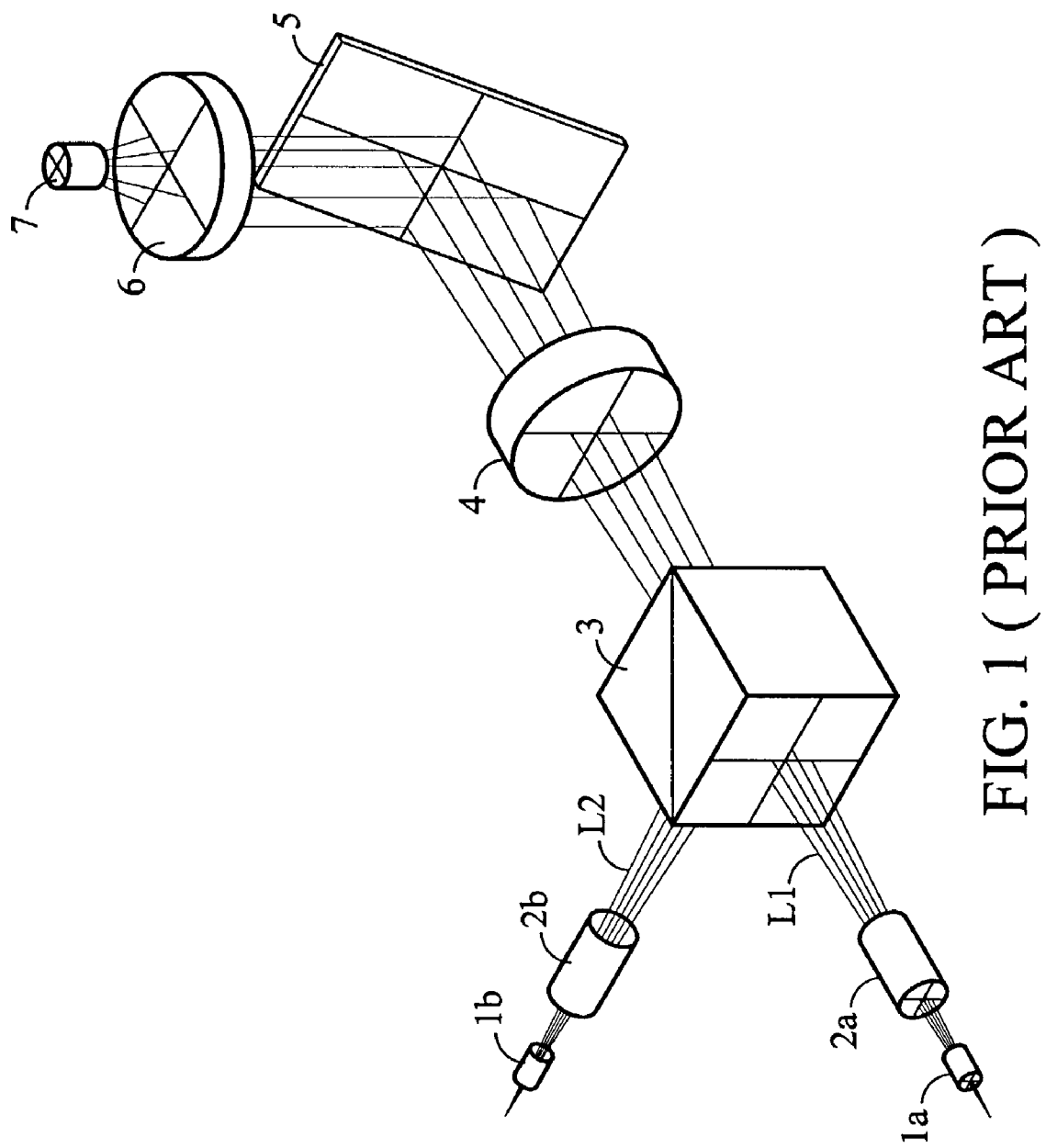
FIG. 1 schematically shows a conventional optical pickup head for accessing a compact disc (CD) and a digital versatile disc (DVD)
Figure 2:
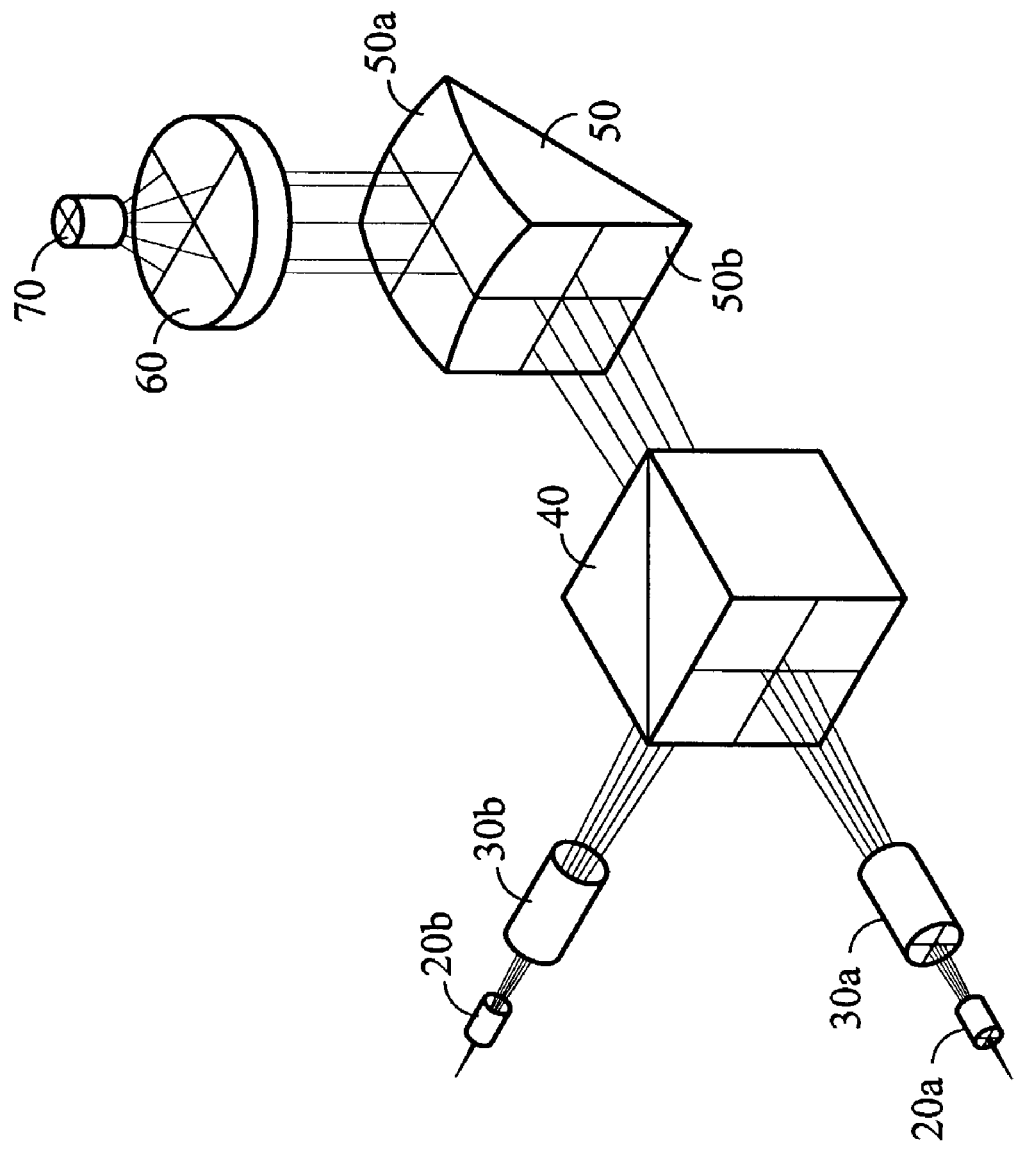
FIG. 2 schematically shows an optical system for accessing a storage medium according to the first embodiment of the invention.

FIG. 2 schematically shows an optical system for accessing a storage medium according to the first embodiment of the invention. In the first embodiment of the invention, the optical system for accessing a storage medium includes a first laser diode 20a, a second laser diode 20b, a first holographic optical element (HOE) 30a, a second HOE 30b, a beam splitter 40, a right-angle prism 50 and an objective lens 60. At least one surface 50a or 50b constructing the right angle of the right-angle prism is a spherical or aspherical convex surface and has a collimating function. Thus, the beam emitted from the right-angle prism 50 is collimated and incident on the objective lens 60.

Figure 3A:
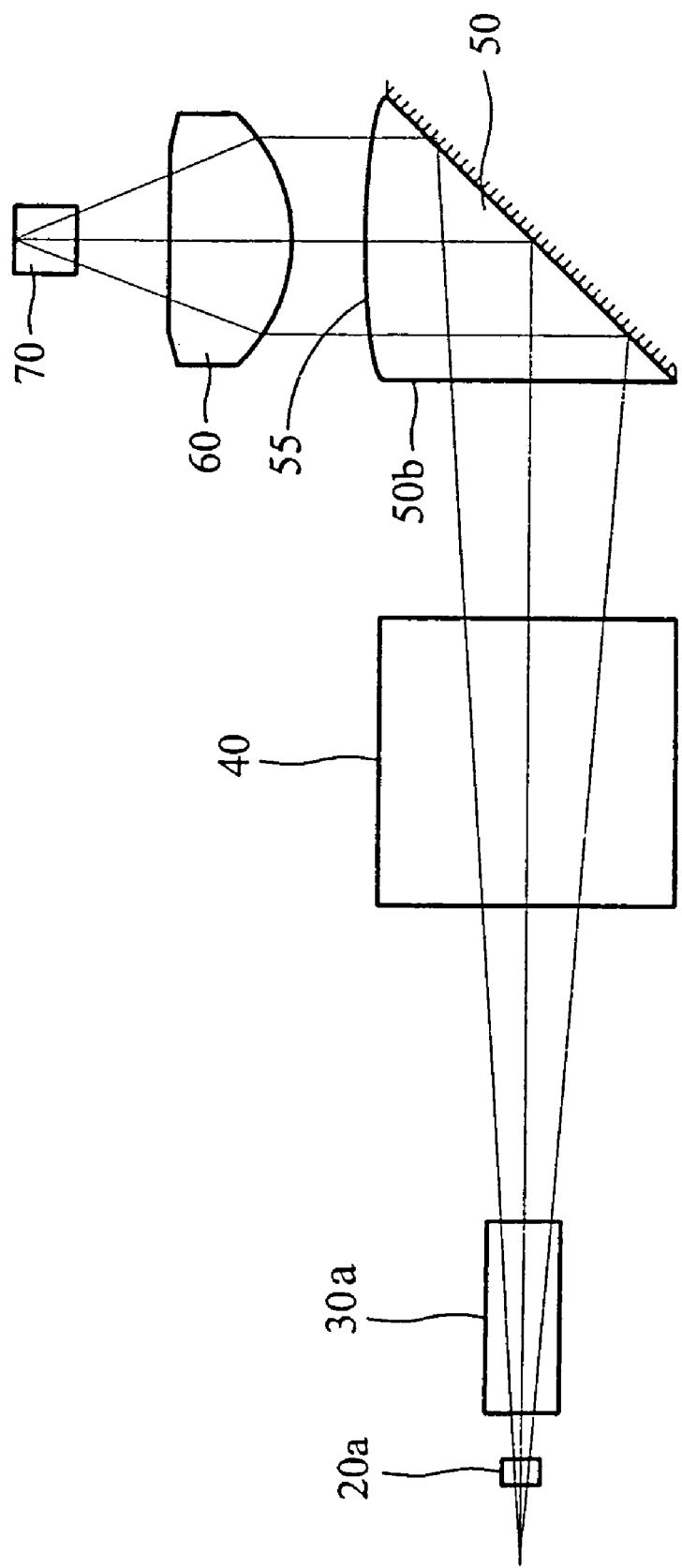
FIG. 3A is a side view of the first embodiment of the invention and schematically shows the ray tracing therein.

FIG. 3A is a side view of the first embodiment of the invention and schematically shows the ray tracing therein. As shown in FIG. 3A, a beam with a wavelength of 650 nm emitted from the first laser diode 20a is incident on the first HOE 30a. After passing the first HOE 30a, the beam is incident on the beam splitter 40. After passing the beam splitter 40, the beam is incident on the right-angle prism 50. The right-angle prism 50 deviates the beam normal to the incident surface 50b by 90°, that is to say, the beam is internally reflected. At least one of the two surfaces 50a, 50b constructing the right angle of the right-angle prism is a convex surface 55, such as a spherical convex surface or an aspherical convex surface. Thus, a collimated beam is emitted from the right-angle prism 50, and then the collimated beam from the right-angle prism 50 is projected on the storage medium 70, such as a digital versatile disc (DVD) by the objective lens 60. Next, the DVD 7 emits a signal beam, and then the signal beam following the foregoing optical path enters a detector (not shown) adjacent to the first laser diode 20a, whereby the detector converts the signal beam reflected from the DVD 70 to an electric signal.

Figure 3B:
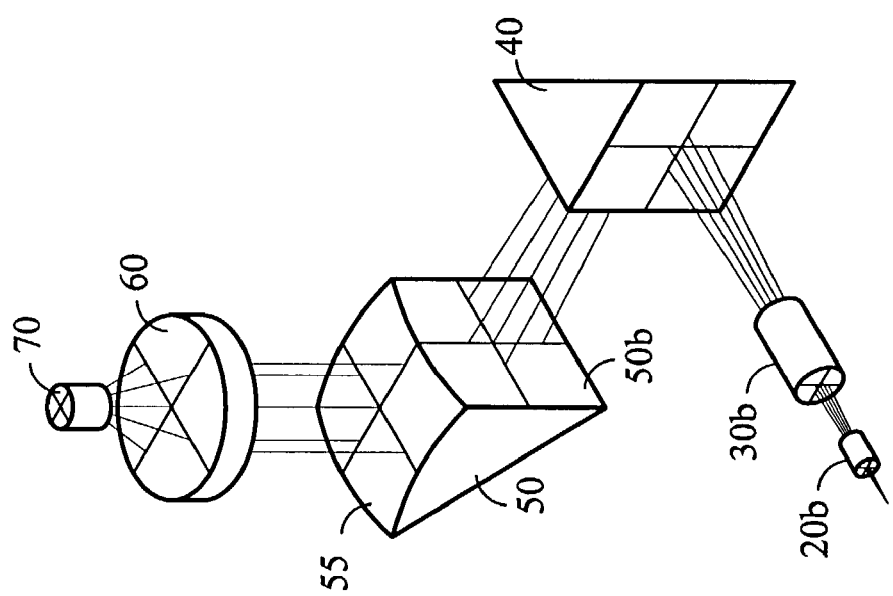
FIG. 3B is a three-dimensional view of the first embodiment of the invention and schematically shows the ray tracing therein.

FIG. 3B is a three-dimensional view of the first embodiment of the invention and schematically shows the ray tracing therein. As shown in FIG. 3B, a beam with a wavelength of 780 nm emitted from the second laser diode 20b is incident on the second HOE 30b. After passing the second HOE 30b, the beam is incident on the beam splitter 40, and the beam splitter 40 deviates the beam normal to the incident surface by 90° and emits the beam again. The beam emitted from the beam splitter 40 is incident on the right-angle prism 50. The right-angle prism 50 deviates the beam normal to the incident surface 50b by 90°, that is to say, the beam is internally reflected. A collimated beam is emitted from the right-angle prism 50, and then the collimated beam from the right-angle prism 50 is projected on the storage medium 70, such as a compact disc (CD) by the objective lens 60. Next, the CD 70 emits another signal beam, and then the signal beam following the foregoing optical path enters a detector (not shown) adjacent to the second laser diode 20b, whereby the detector converts the signal beam reflected from the CD 70 to an electric signal.

In the first embodiment of the invention, the right-angle prism 50 has replaced the collimating lens 4 and the mirror 5 used in the prior art. The right-angle prism 50 deviates the beam by 90° and emits a collimated beam by a spherical convex surface or an aspherical convex surface constructing the right angle thereof. In the first embodiment of the invention, the optical path length from the first laser diode 20a to the DVD 70 is 19.919 mm. Compared with the prior art, the optical path length shortens 2.813 mm.

Second Embodiment

Figure 4:
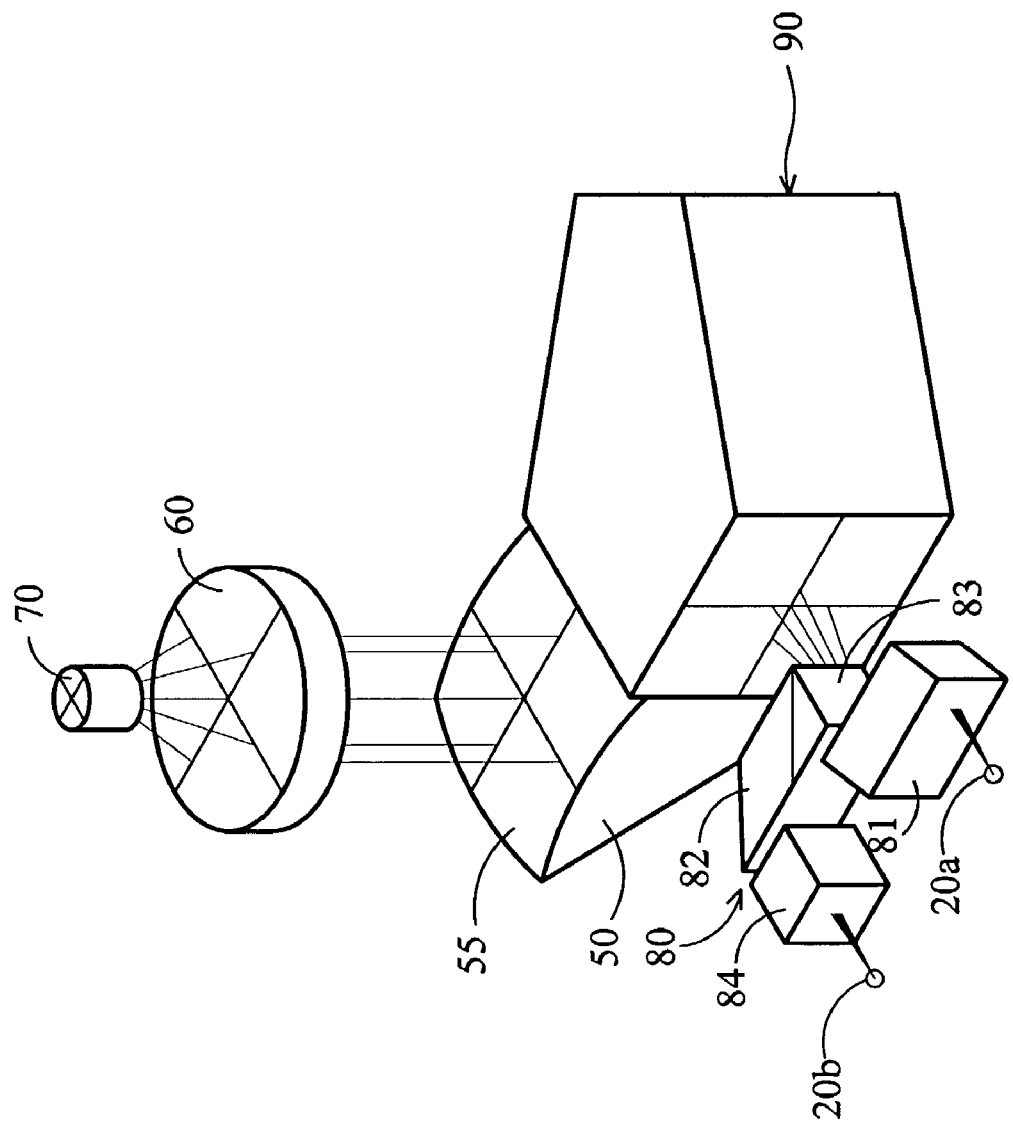
FIG. 4 schematically shows an optical system for accessing a storage medium according to the second embodiment of the invention.

FIG. 4 schematically shows an optical system for accessing a storage medium according to the second embodiment of the invention. In the second embodiment of the invention, the optical system for accessing a storage medium includes a first laser diode 20a, a second laser diode 20b, a Carl Zeiss Binocular-Ocular prism (CZBO prism) 80, a Penta prism 90, a right-angle prism 50 and an objective lens 60. At least one surface 50a or 50b constructing the right angle of the right-angle prism 50 is a spherical or aspherical convex surface and has a collimating function. Thus, the beam emitted from the right-angle prism 50 is collimated and incident on the objective lens 60.

Figure 5A:
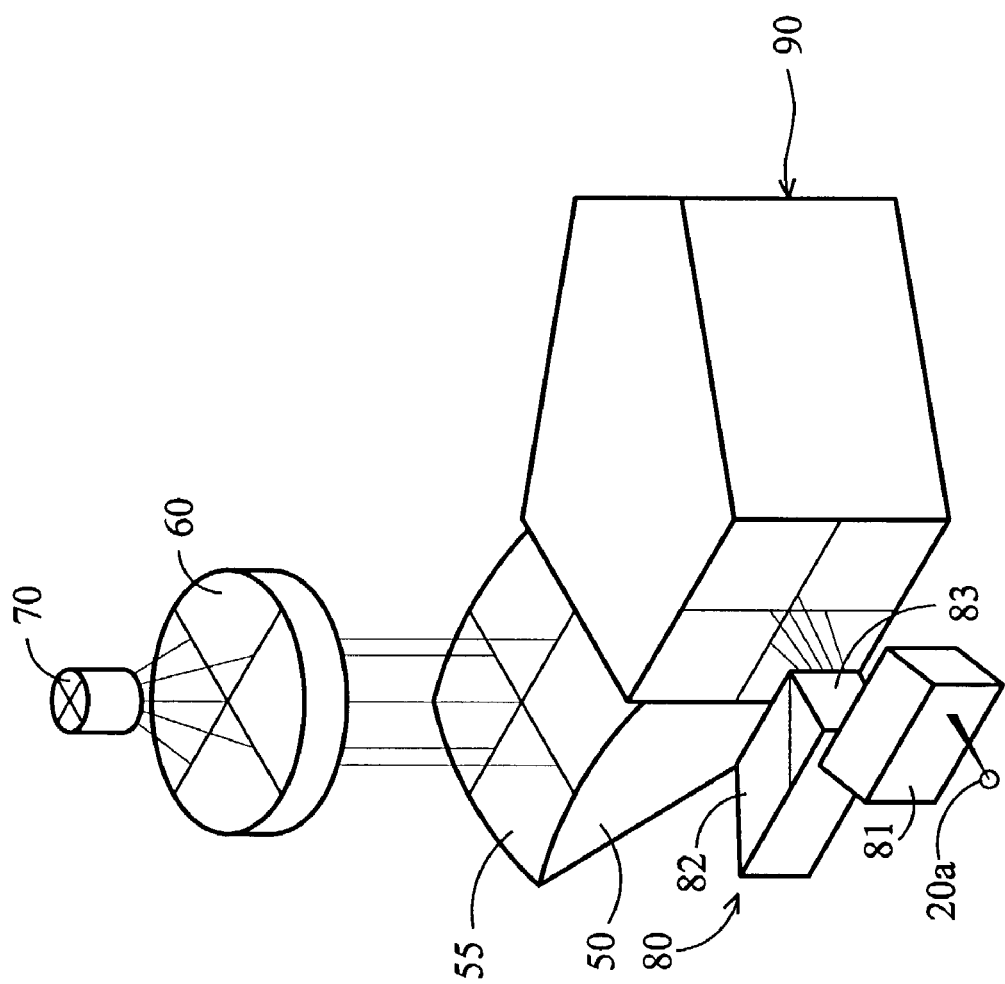
FIG. 5A is a three-dimensional view of the second embodiment of the invention and schematically shows the ray tracing from the first laser diode to the storage medium.
Figure 5B:
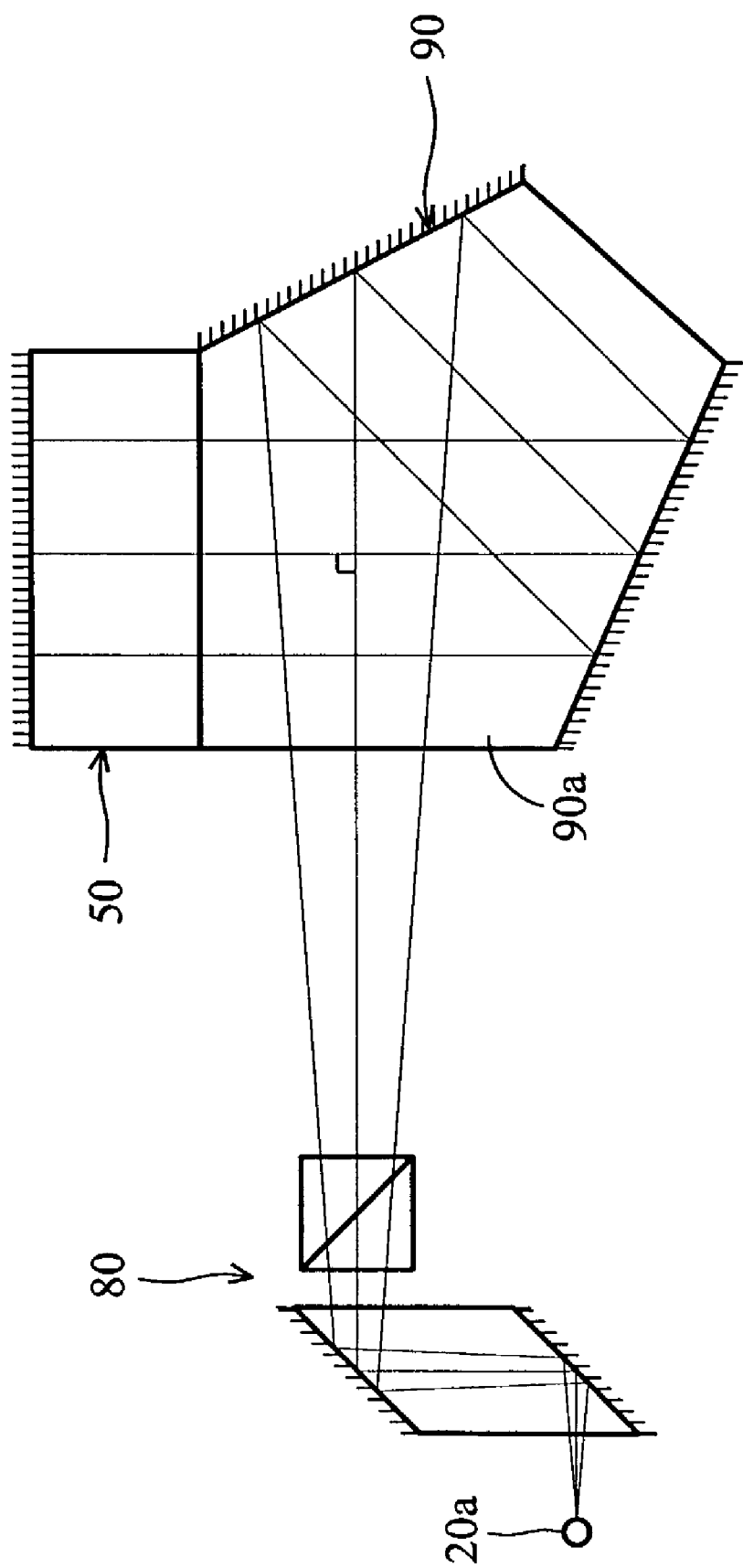
FIG. 5B is a vertical view of the second embodiment of the invention and schematically shows the ray tracing from the first laser diode to the storage medium.

FIG. 5A is a three-dimensional view of the second embodiment of the invention and schematically shows the ray tracing from the first laser diode to the storage medium, and FIG. 5B is a vertical view of the second embodiment of the invention and schematically shows the ray tracing from the first laser diode to the storage medium. As shown in FIGS. 5A and 5B, a beam with a wavelength of 650 nm emitted from the first laser diode 20a is incident on the CZBO prism 80. Two internal reflections take place to redirect the beam in the CZBO prism 80. After passing the CZBO prism 80, the beam is incident on the Penta prism 90. The Penta prism 90 deviates the beam by 90° and emits the beam, wherein two of its surfaces must be silvered. After emitting the beam, the beam is incident on the right-angle prism 50. The right-angle prism 50 deviates the beam normal to the incident surface 50b by 90°, that is to say, the beam is internally reflected. At least one of the two surfaces 50a, 50b constructing the right angle of the right-angle prism is a convex surface 55, such as a spherical convex surface or an aspherical convex surface. Thus, a collimated beam is emitted from the right-angle prism 50, and then the collimated beam from the right-angle prism 50 is projected on the storage medium 70, such as a digital versatile disc (DVD) by the objective lens 60. Next, the DVD 70 emits a signal beam, and then the signal beam following the foregoing optical path enters a detector (not shown) adjacent to the first laser diode 20a, whereby the detector converts the signal beam reflected from the DVD 70 to an electric signal.

Figure 5C:
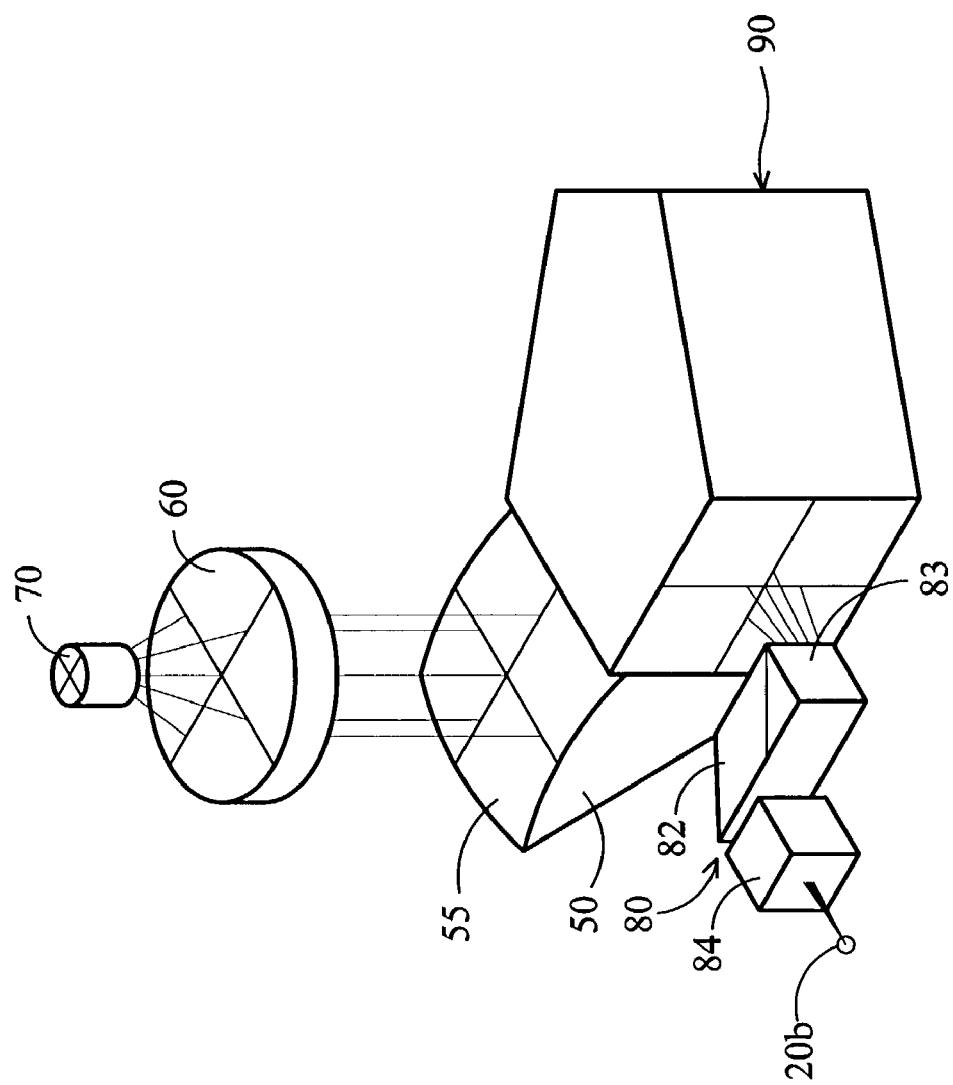
FIG. 5C is another three-dimensional view of the second embodiment of the invention and schematically shows the ray tracing from the second laser diode to the storage medium.
Figure 5D:
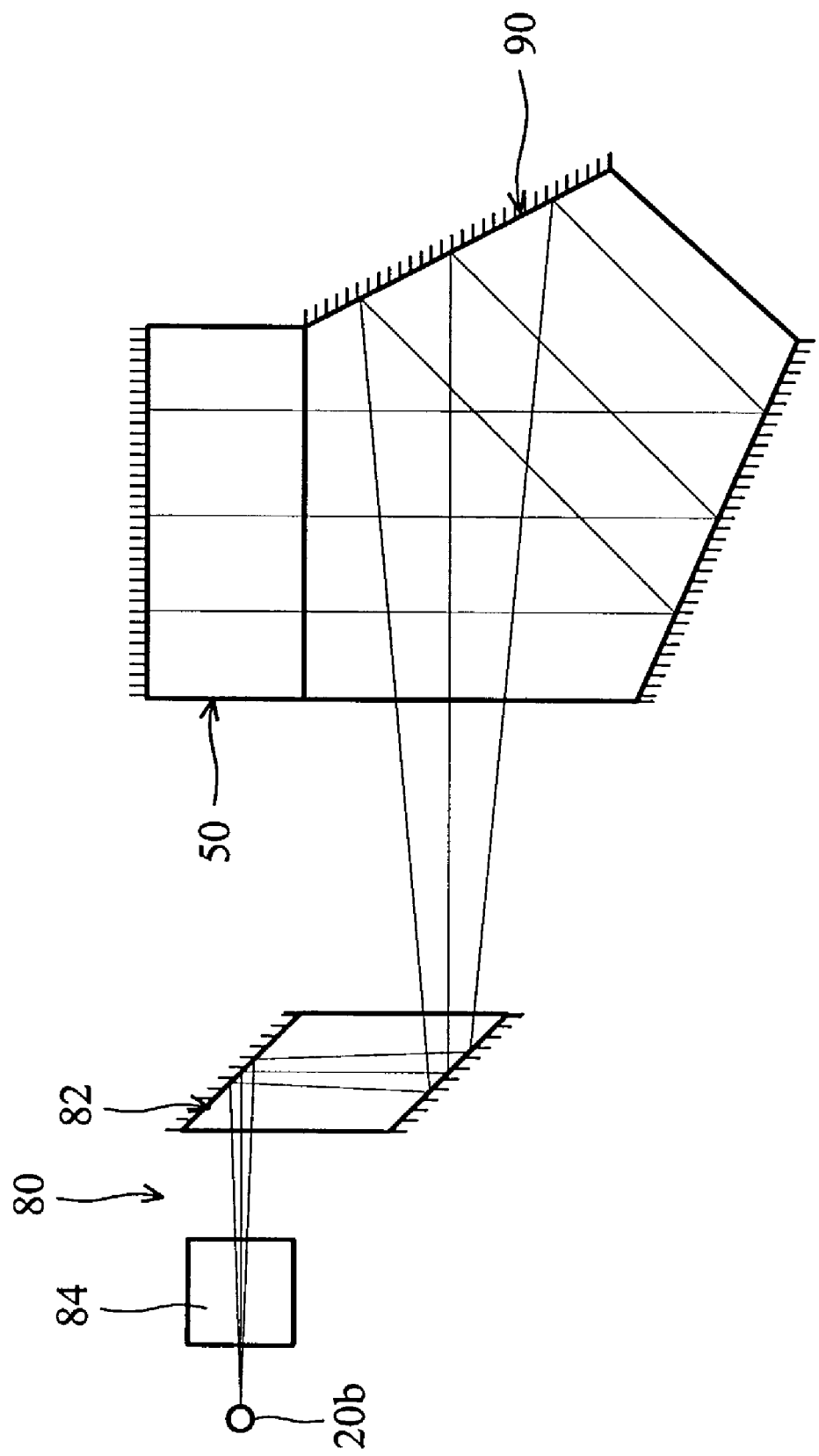
FIG. 5D is another vertical view of the second embodiment of the invention and schematically shows the ray tracing from the second laser diode to the storage medium.

FIG. 5C is another three-dimensional view of the second embodiment of the invention and schematically shows the ray tracing from the second laser diode to the storage medium; and FIG. 5D is another vertical view of the second embodiment of the invention and schematically shows the ray tracing from the second laser diode to the storage medium. As shown in FIGS. 5C and 5D, a beam with a wavelength of 780 nm emitted from the second laser diode 20b is incident on the CZBO prism 80. In the CZBO prism 80, the beam passes the OPL (optical path length) compensator 84 and the rhomboidal prism 82 in sequence, whereby one internal reflection and one mirror reflection take place to redirect the beam in the CZBO prism 80. After passing the CZBO prism 80, the beam is incident on the Penta prism 90. The Penta prism 90 deviates the beam by 90° and emits the beam, wherein two of its surfaces must be silvered. After emitting the beam, the beam is incident on the right-angle prism 50. The right-angle prism 50 deviates the beam normal to the incident surface 50b by 90°, that is to say, the beam is internally reflected. At least one of the two surfaces 50a, 50b constructing the right angle of the right-angle prism is a convex surface 55, such as a spherical convex surface or an aspherical convex surface. Thus, a collimated beam is emitted from the right-angle prism 50, and then the collimated beam from the right-angle prism 50 is projected on the storage medium 70, such as a compact disc (CD) by the objective lens 60. Next, the CD 70 emits a signal beam, and then the signal beam following the foregoing optical path enters a detector (not shown) adjacent to the second laser diode 20b, whereby the detector converts the signal beam reflected from the CD 70 to an electric signal.

In the second embodiment of the invention, the right-angle prism 50 has replaced the collimating lens 4 and the mirror 5 used in the prior art, the CZBO prism 80 has replaced the beam splitter 3 used in the prior art, and the Penta prism 90 folds the optical path. The two laser diodes 20a, 20b are positioned abreast by utilizing the CZBO prism 80, and packaged with the CZBO prism 80. The Penta prism 90 reflects the beam twice and shrinks the space of the optical system. Moreover, the right-angle prism 50 deviates the beam by 90° and emits a collimated beam by a spherical convex surface or an aspherical convex surface constructing the right angle thereof.

In the second embodiment of the invention, the optical system for accessing a storage medium has a length of 7.587 mm, a width of 5.743 mm and a height of 6.186 mm.

Third Embodiment

Figure 6:
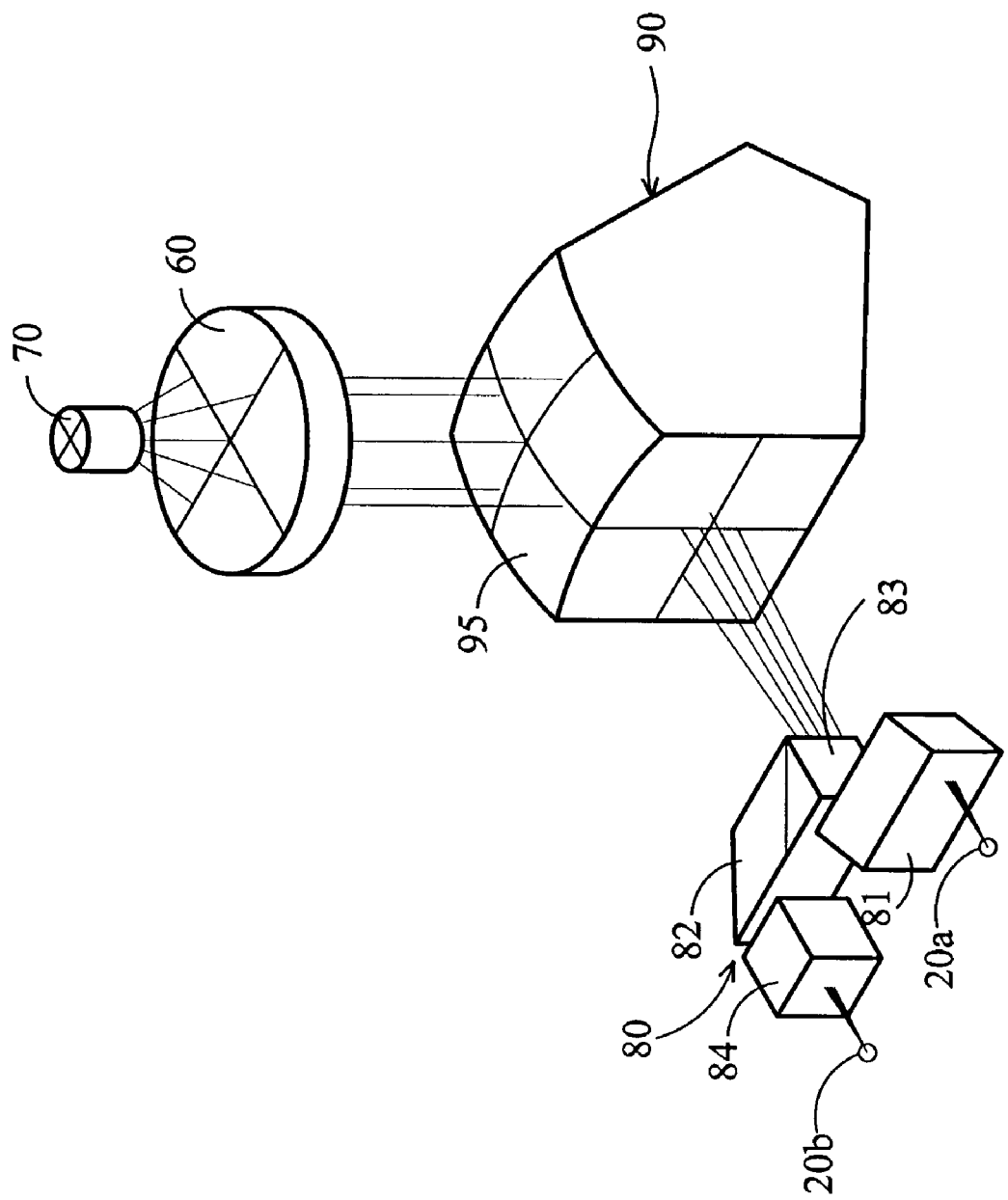
FIG. 6 schematically shows an optical system for accessing a storage medium according to the third embodiment of the invention.

FIG. 6 schematically shows an optical system for accessing a storage medium according to the third embodiment of the invention. In the third embodiment of the invention, the optical system for accessing a storage medium includes a first laser diode 20a, a second laser diode 20b, a Carl Zeiss Binocular-Ocular prism (CZBO prism) 80, a Penta prism 90, and an objective lens 60. At least one emitting surface of the Penta prism 90 is an aspherical surface, so as to emit a collimated beam from the Penta prism 90. Thus, the beam emitted from the Penta prism 90 is collimated and incident on the objective lens 60. The CZBO prism 80 has two rhomboidal prisms 81, 82, a right-angle prism 83 and an OPL (optical path length) compensator 84.

Figure 7A:
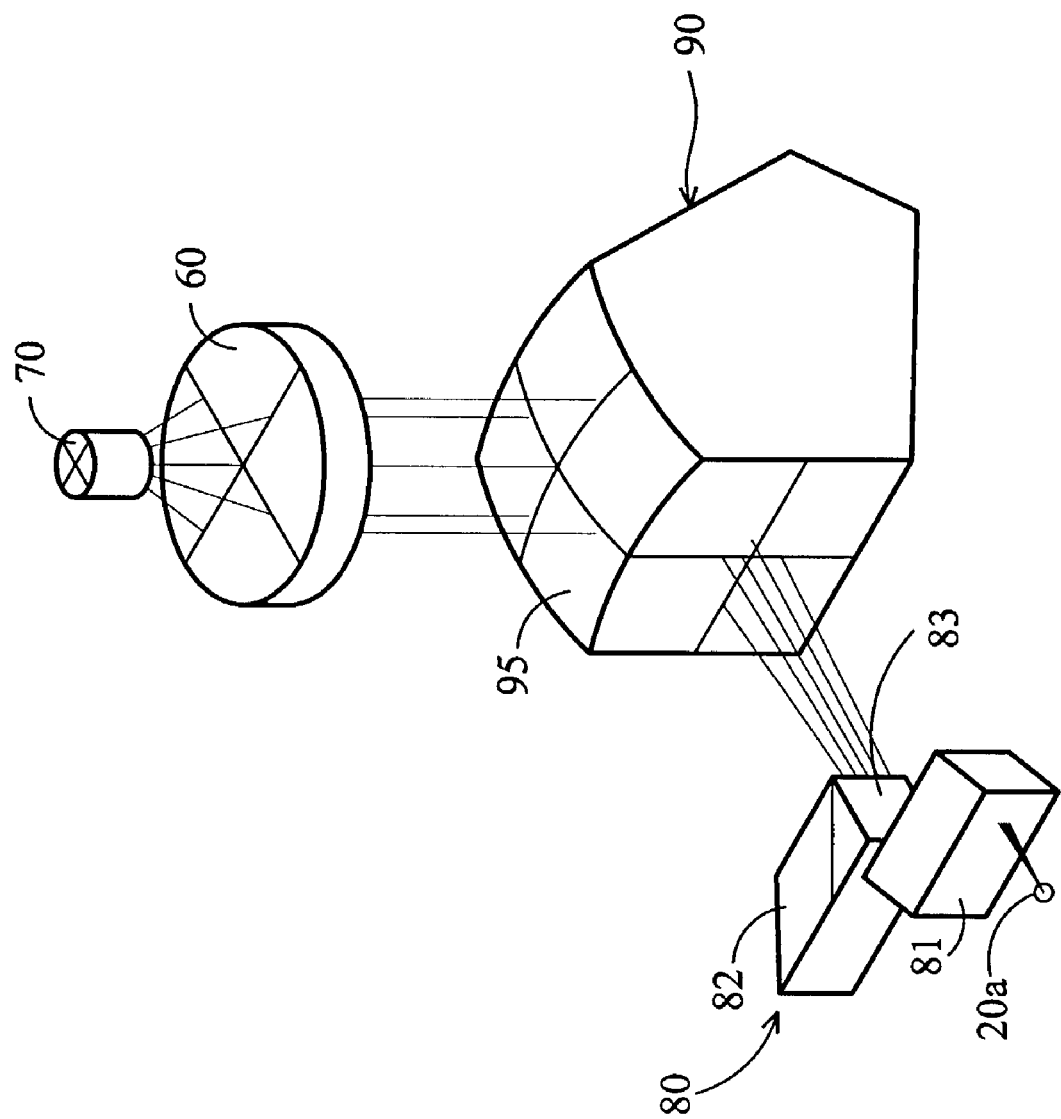
FIG. 7A is a three-dimensional view of the third embodiment of the invention and schematically shows the ray tracing from the first laser diode to the storage medium.
Figure 7B:
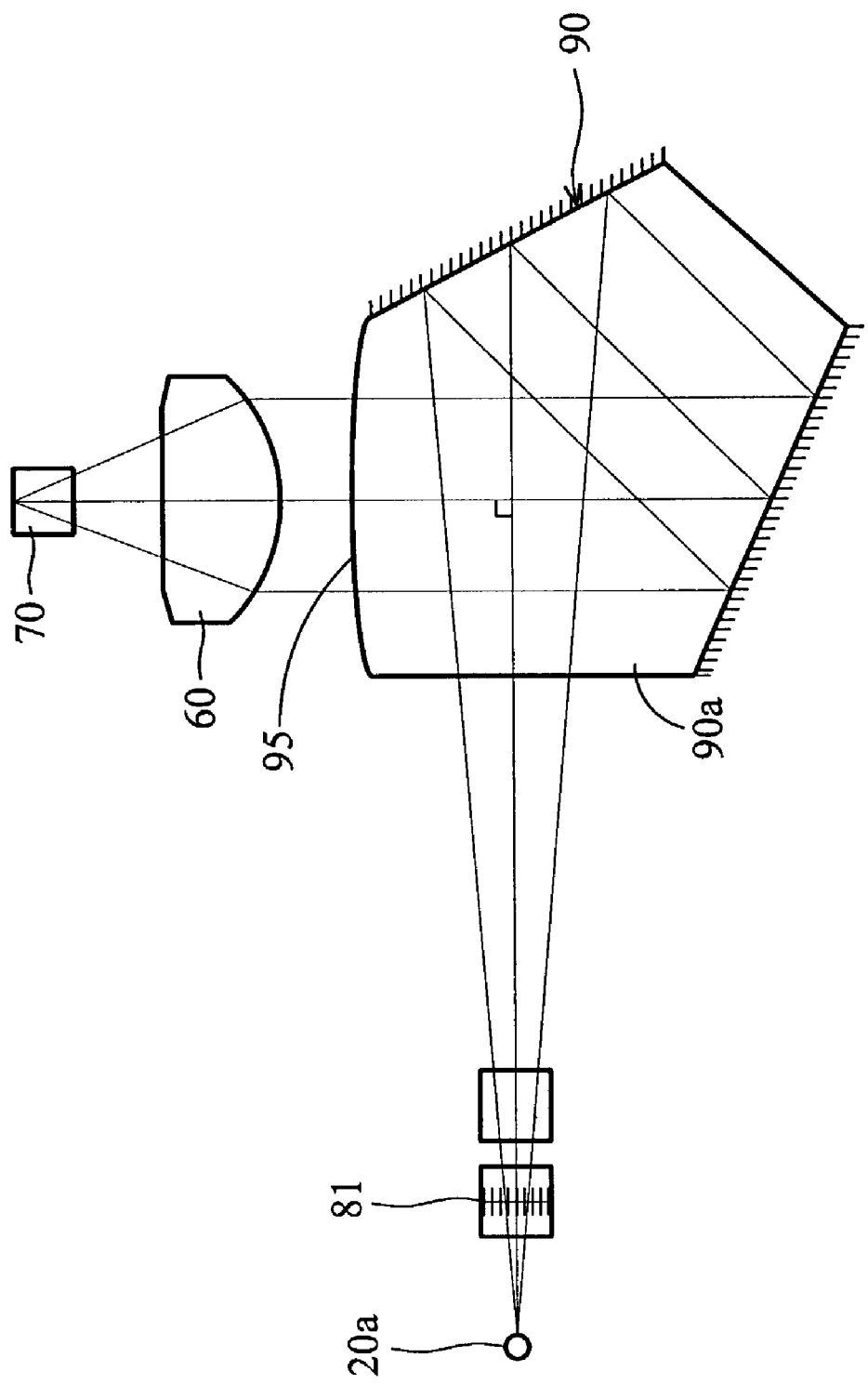
FIG. 7B is a vertical view of the third embodiment of the invention and schematically shows the ray tracing from the first laser diode to the storage medium.

FIG. 7A is a three-dimensional view of the third embodiment of the invention and schematically shows the ray tracing from the first laser diode to the storage medium, and FIG. 7B is a vertical view of the second embodiment of the invention and schematically shows the ray tracing from the first laser diode to the storage medium. As shown in FIGS. 7A and 7B, a beam with a wavelength of 650 nm emitted from the first laser diode 20a is incident on the CZBO prism 80. Two internal reflections take place to redirect the beam in the CZBO prism 80. After passing the CZBO prism 80, the beam is incident on the Penta prism 90. The Penta prism 90 deviates the beam by 90° and emits the collimated beam, wherein two of its surfaces must be silvered. After emitting the collimated beam from the Penta prism 90, the collimated beam is projected on the storage medium 70, such as a digital versatile disc (DVD) by the objective lens 60. Next, the DVD 70 emits a signal beam, and then the signal beam following the foregoing optical path enters a detector (not shown) adjacent to the first laser diode 20a, whereby the detector converts the signal beam reflected from the DVD 70 to an electric signal.

Figure 7C:
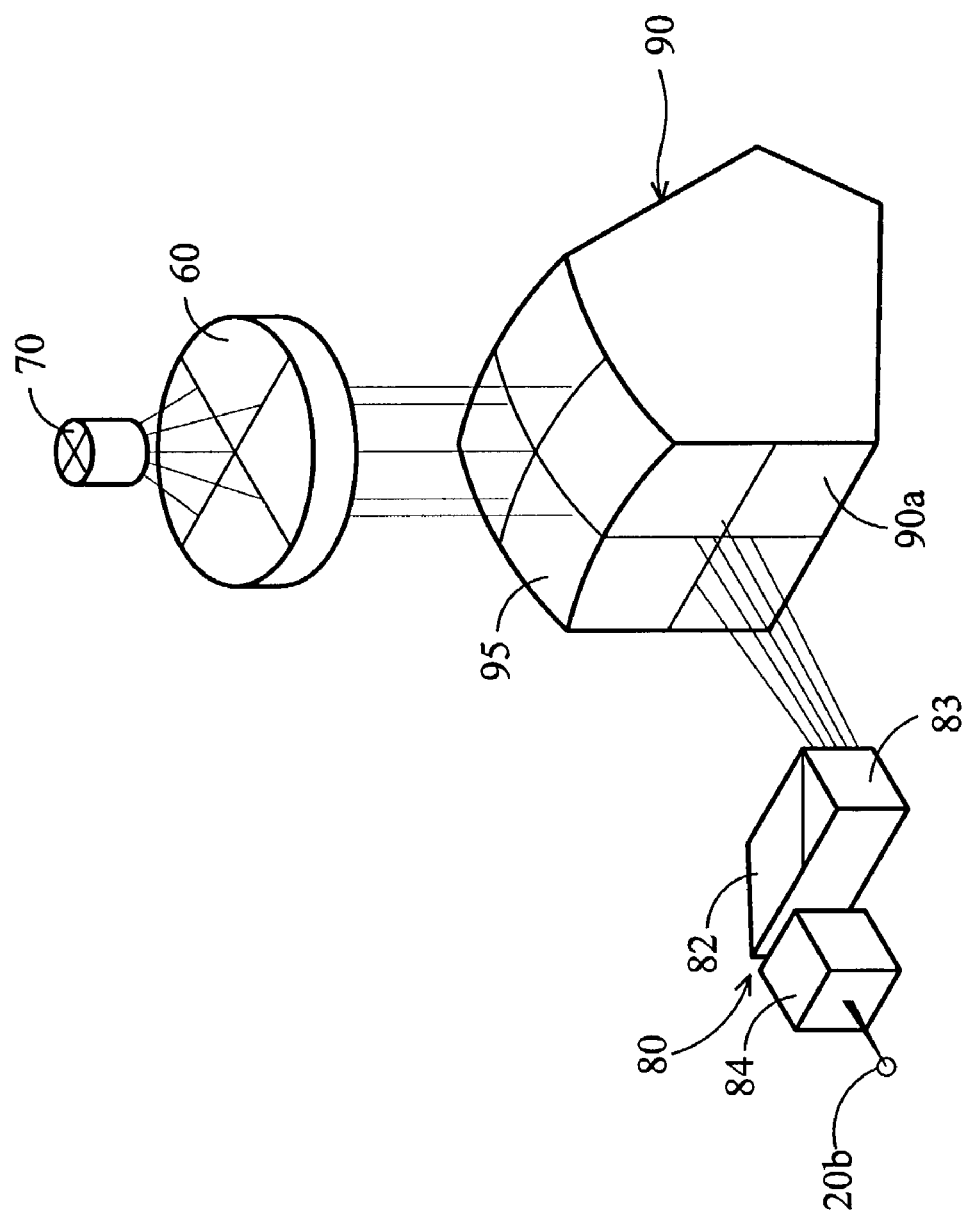
FIG. 7C is another three-dimensional view of the third embodiment of the invention and schematically shows the ray tracing from the second laser diode to the storage medium.
Figure 7D:
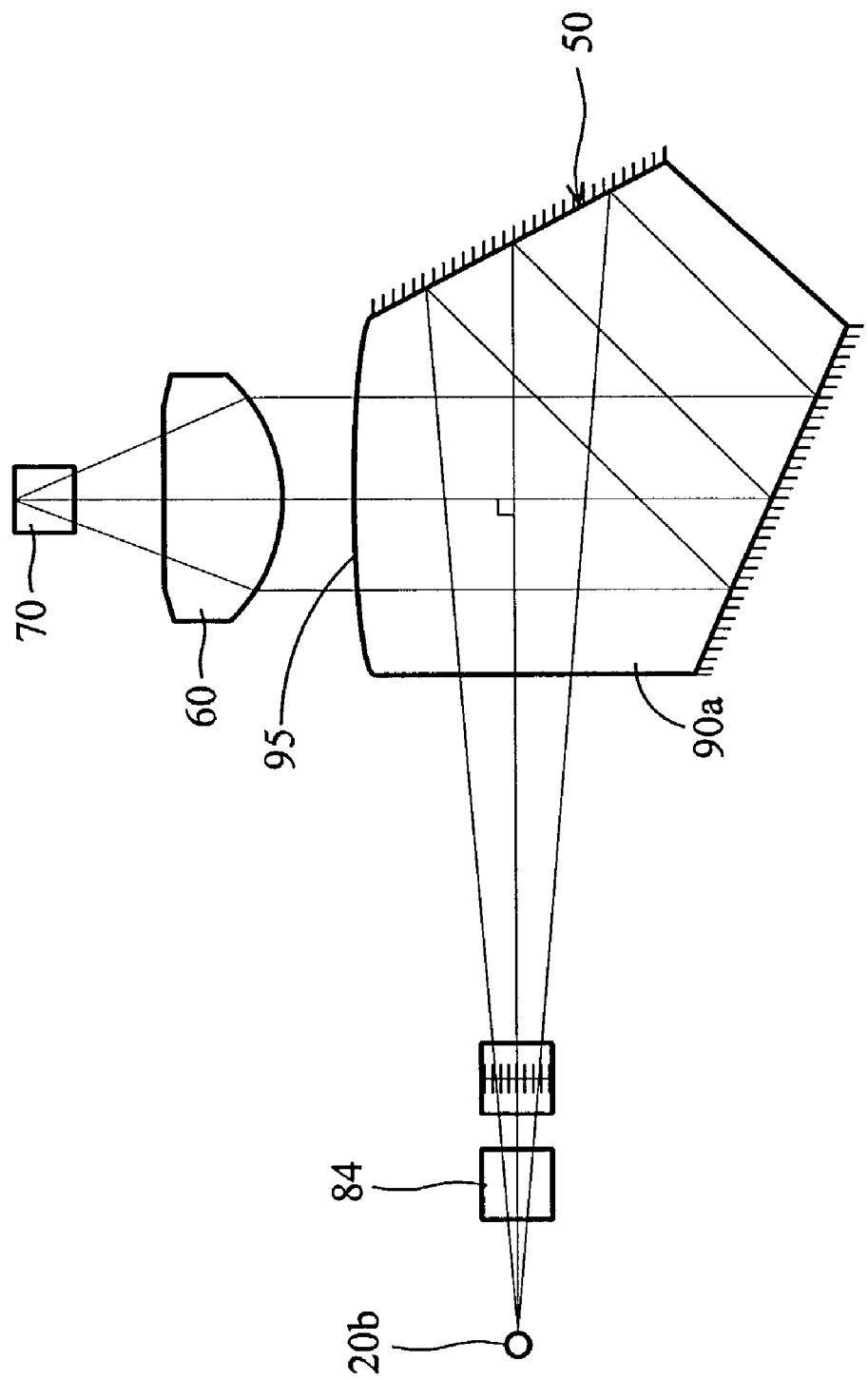
FIG. 7D is another vertical view of the third embodiment of the invention and schematically shows the ray tracing from the second laser diode to the storage medium.

FIG. 7C is another three-dimensional view of the third embodiment of the invention and schematically shows the ray tracing from the second laser diode to the storage medium; and FIG. 7D is another vertical view of the third embodiment of the invention and schematically shows the ray tracing from the second laser diode to the storage medium. As shown in FIGS. 7C and 7D, a beam with a wavelength of 780 nm emitted from the second laser diode 20b is incident on the CZBO prism 80. In the CZBO prism 80, the beam passes the OPL (optical path length) compensator 84 and the rhomboidal prism 82 in sequence, whereby one internal reflection and one mirror reflection take place to redirect the beam in the CZBO prism 80. After passing the CZBO prism 80, the beam is incident on the Penta prism 90. The Penta prism 90 deviates the beam by 90° and emits the collimated beam, wherein two of its surfaces must be silvered. After emitting the collimated beam from the Penta prism 90, the collimated beam is projected on the storage medium 70, such as a compact disc (CD) by the objective lens 60. Next, the CD 70 emits a signal beam, and then the signal beam following the foregoing optical path enters a detector (not shown) adjacent to the second laser diode 20b, whereby the detector converts the signal beam reflected from the CD 70 to an electric signal.

In the third embodiment of the invention, the CZBO prism 80 has replaced the beam splitter 3 used in the prior art, and the Penta prism 90 folds the optical path and has replaced the collimating lens 4 and the mirror used in the prior art. The two laser diodes 20a, 20b are positioned abreast by utilizing the CZBO prism 80, and packaged with the CZBO prism 80. The Penta prism 90 reflects the beam twice and shrinks space of the optical system. Furthermore, the Penta prism 90 deviates the beam by 90° and emits a collimated beam by a spherical convex surface or an aspherical convex surface.

In the third embodiment of the invention, the optical system for accessing a storage medium has a length of 9.493 mm, and a height of 7.429 mm.

While the preferred embodiment of the present invention has been described, it is to be understood that modifications will be apparent to those skilled in the art without departing from the spirit of the invention. The scope of the invention, therefore, is to be determined solely by the following claims.

What is claimed is:

1. An optical system for accessing a storage medium comprising:
   a CZBO prism for transmitting a beam of first wavelength and a beam of second wavelength by two reflections;
   a Penta prism having a convex surface for emitting a collimated beam, wherein the Penta prism reflects the beam from the CZBO prism twice and deviating the beam by 90°, and reflecting the beam from the storage medium and deviating the beam by 90°; and an objective lens for projecting the collimated beam on the storage medium and redirecting the beam from the storage medium to the Penta prism.

2. The optical system for accessing a storage medium as claimed in claim 1, wherein the convex surface is provided with a spherical convex surface.

3. The optical system for accessing a storage medium as claimed in claim 1, wherein the convex surface is provided with an aspherical convex surface.

4. An optical system for accessing a storage medium as claimed in claim 1, further comprising two laser diodes, which are positioned abreast by utilizing the CZBO prism and packaged with the CZBO prism.

* * * * *